United States Patent [19]

Angst

[11] 4,253,050
[45] Feb. 24, 1981

[54] METHOD AND APPARATUS FOR THE SYNCHRONIZATION OF A GEAR MACHINING APPARATUS

[75] Inventor: Arthur Angst, Wil, Switzerland

[73] Assignee: Reishauer AG, Zurich, Switzerland

[21] Appl. No.: 904,968

[22] Filed: May 11, 1978

[30] Foreign Application Priority Data

Jun. 1, 1977 [DE] Fed. Rep. of Germany ....... 2724602

[51] Int. Cl.³ .......................... H02P 5/46; H02P 7/68
[52] U.S. Cl. ..................................... 409/12; 318/314; 318/561; 318/78; 318/85; 51/95 GH; 409/15
[58] Field of Search ...................... 318/41, 69, 77, 78, 318/85, 561, 314; 90/4; 51/287, 95 GH

[56] References Cited

U.S. PATENT DOCUMENTS

| | | | |
|---|---|---|---|
| 3,204,532 | 9/1965 | Budnick | 90/4 |
| 3,232,170 | 2/1966 | Findley | 90/4 |
| 3,254,566 | 6/1966 | Bradner | 90/4 |
| 3,917,930 | 11/1975 | Davey et al. | 318/561 |

FOREIGN PATENT DOCUMENTS 890420  7/1949  Fed. Rep. of Germany.
2444975  4/1976  Fed. Rep. of Germany.

Primary Examiner—Gene Z. Rubinson
Assistant Examiner—Eugene S. Indyk
Attorney, Agent, or Firm—Sughrue, Rothwell, Mion, Zinn and Macpeak

[57] ABSTRACT

This invention concerns a method for the synchronization of a gear machining instrument that works according to the hobbing method. It has different drives for the tool and the work-piece. In the process, a series of pulses are produced, dependent upon the rotational speed of each drive. The occurrence of the pulses are compared digitally resulting in an analog control signal for the adjustment of the work-piece drive.

9 Claims, 4 Drawing Figures

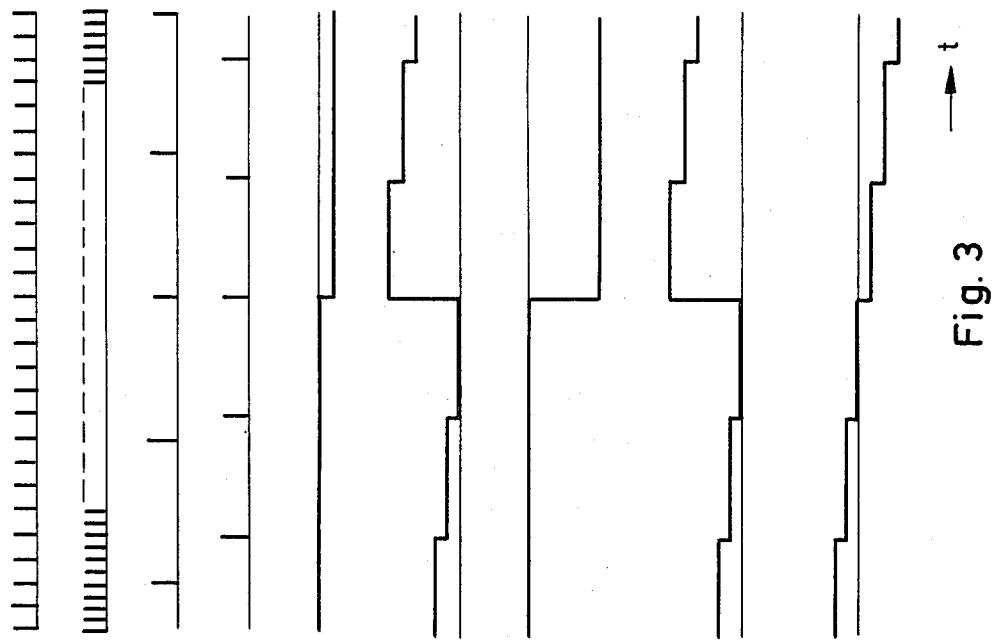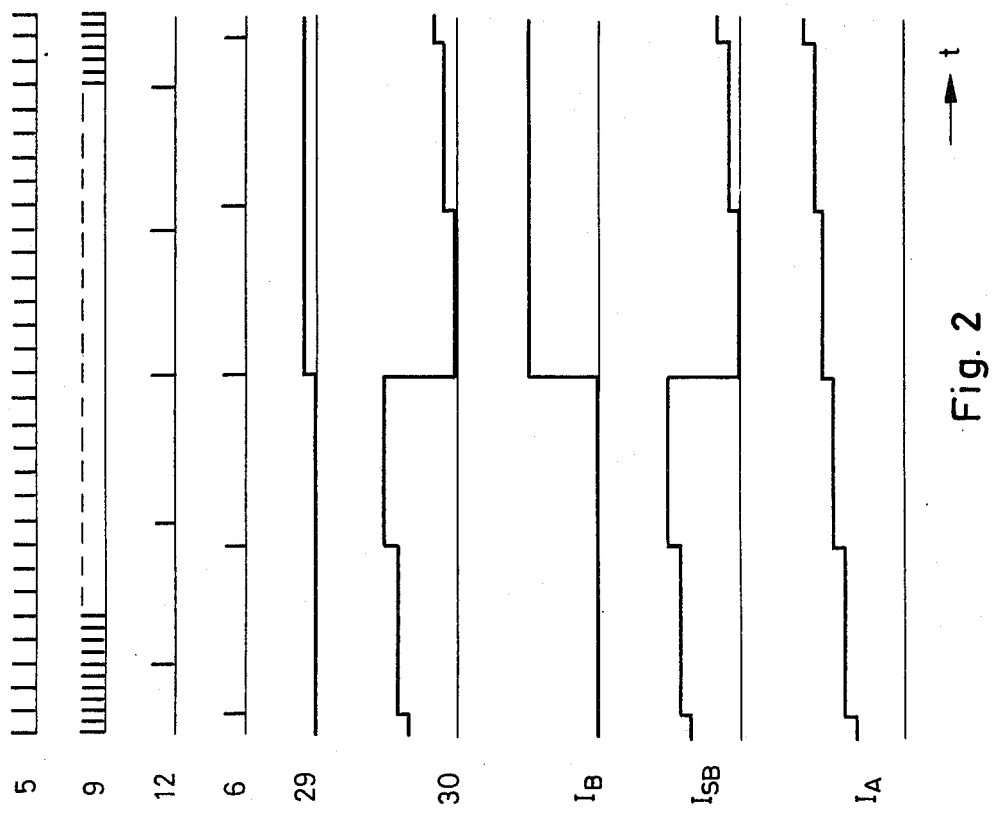

METHOD AND APPARATUS FOR THE SYNCHRONIZATION OF A GEAR MACHINING APPARATUS

BACKGROUND OF THE INVENTION

In tooth flank grinding machines that work according to the hobbing method, the grinding wheel, for instance a worm gear and the work-piece must run at a specific rotational relationship to each other with extreme precision. The same applies to a hobbing machine.

A method for the establishment of a control value is known as set forth in German Pat. No. 890 420, in which for each of two or more movements that are to be brought into dependence of each other, a pulse sequence is developed. The pulse sequences are compared to each other in respect of their frequencies. On the basis of the value and direction of the control value produced, one of the movements can be controlled until an argreement of the pulse sequences is attained.

Higher precision can be attained if, according to German Pat. No. 890 420, deviations from the phase position of two pulse sequences, derived from the movement, are used for the establishment of the control values. Here, the control value serves the readjustment of one of the movements, so that the movements can be brought into any desired dependence of each other, by using various divisions in respect of the moving bodies, e.g. the tool or the work-piece and by utilizing electrical pulse division or pulse multiplication.

A machine tool that is based upon the comparison of phase position of two speed-dependently produced pulse series, for the production of gears according to the hobbing principle, is disclosed in German Patent application 24 44 975. In this machine tool, the angular encoders that are assigned to the tool and the work-piece, produce an pulse number per revolution that is either equal to or deviates from each other by an even-numbered multiple. A pulse comparator only compares the pulse of the tool angular encoder that corresponds to the impulse of the desired number of teeth of the work-piece vis-a-vis the position of the rise of its slope with the rise of the slope that is given by the pulse of the work-piece angular encoder. This causes a synchronization of the drives in their dependence on the pulse slope-rises, since the control value that is produced by the impulse comparator is proportional to the angular difference of the two drives.

This known comparison of the phase position of the two pulse sequences that were produced in dependence on the rotation (rpm), shows the disadvantage that the measurement of the lead and lag that was taken by the pulse comparator is dependent upon the speed of rotation of the work piece since a time-dependent phase analysis takes place. If the angular speed of the work piece is not constant, then the phase signal is wrong in this technique. The prior art machine took therefore, has insufficient accuracy for the production of precision gears.

It is the task of the present invention to produce a method of the type mentioned above, in which the phase comparison is independent of the speed of rotation of the tool. In order to solve this task, the invention uses the resolution of the produced regulating value by impulses of the tool drive, in multiples several times more numerous than by time unit.

According to the invention, the method of the type mentioned above is characterized in that the difference between the number of pulses of the tool drive, divided by the number of teeth of the work piece, and the number of pulses of the work piece drive is developed continuously, whereby the number of pulses of the tool drive per time unit is greater by a multiple than that of the work piece drive in the same time unit. The results of the formation of the difference and impulse count, are transformed, independently, into analog signals which are summed for the formation of the control signal, whereby the conversion of the result of the impulse counting takes place in dependence on the reciprocal of the number of teeth of the work-piece.

As a result in the method of the present invention, an analog control signal is formed not only from the difference of the count of the work piece pulses and the tool pulses divided by the number of teeth, but also the tool pulses are counted in the time interval between two work piece pulses and, under consideration of the number of teeth, are transformed into an additional analog signal. Hence, a grid of pulses may be interjected between two work-piece pulses permitting a spacially precise phase comparison that is independent of the rotation rate of the tool, since the pulses of the tool correspond to a turning angle, rather than to a temporal displacement and, therefore, are independent of time and speed.

The arrangement according to the present invention is characterized by the following: an adjustable dividing counter is connected to the angular encoder of the tool drive, which, upon reaching the set counting position delivers a pulse signal at a first output and resets itself automatically, and which delivers continually, at a second output, the current counting position; the first output of the dividing counter and the angular encoder of the work-piece drive are each connected to an input of a balance counter; the second output of the dividing counter and the output of the balance counter are connected by a respective gate circuit controlled by the pulses of the angular encoder of the work-piece drive, to a respective storage unit; and a digital-analog converter is connected to each of the storage units, whose outputs are additively connected with each other for the formation of the regulating signal, whereby a constant reference current to be supplied to the digital-analog converter is assigned to the balance counter, while a proportional reference current is supplied to the digital-analog converter is assigned to the divider counter. This reference current is proportional to the reciprocal of the number of teeth of the work piece.

The arrangement of this invention permits the accomplishment of the phase comparison and, hence, a control signal for the adjustment of the work piece drive, without a large number of electronic switching devices, such as counters, storage units, digital-analog converters. The resolution is determined by the pulses provided by the angular encoder of the tool drive and is independent of the speed of the rotation of the grinding wheel drive.

The process, according to this invention will be further clarified in the following description of the preferred embodiment.

BRIEF DESCRIPTION OF THE DRAWINGS

FIG. 2 shows time-related signal states at various points of the block diagram of FIG. 1, for the case in which the timewise changes of the actual angular position is smaller than the corresponding timewise change of the theoretical angular position, FIG. 3, shows time-related signal states, corresponding to FIG. 2, for the case in which the time-related change of the angular position is greater than the corresponding time change of the theoretical angular position.

DETAILED DESCRIPTION OF THE PREFERRED EMBODIMENT

Figure 1:
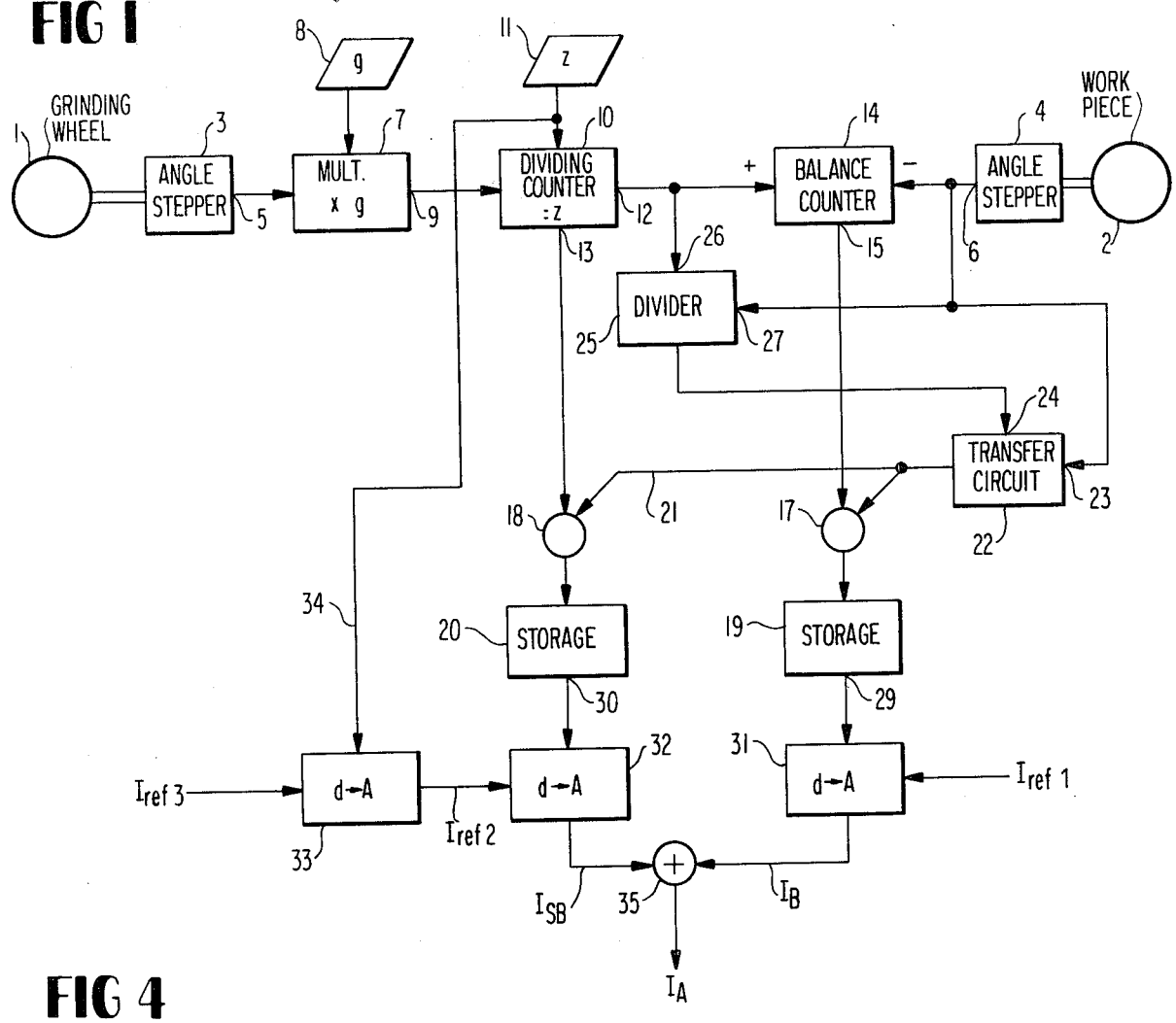
FIG. 1 shows block diagram of the apparatus of the present invention.

Referring to FIG. 1, the block diagram shows a grinding wheel 1, which is driven by an electric motor, not shown. This grinding wheel may also be a grinding worm for the grinding of the tooth flanks of the work-piece 2, which, in turn, is driven by an electric motor, not shown. Angular encoders 3, 4, are solidly connected to the grinding wheel 1 as well as the workpiece 2. Each delivers a pulse for a specific angular change of the grinding wheel 1 or of the work-piece 2. A specific required angle of rotation of the grinding wheel 1 is therefore represented by a corresponding number of impulses at output 5 of the angular encoder 3 and the appropriate actual angle of rotation of the work-piece 2 is represented by a corresponding number of impulses at output 6 of the angular encoder 4.

Connected to the angular encoder 3, is a puls multiplier 7, whose multiplication factor g can be adjusted corresponding to the number of threads g of the grinding wheel 1. The corresponding adjustment is represented as element 8. Accordingly, the pulse multiplier 7, produces at its output 9, g pulses per pulse of the encoder 3. A dividing counter 10 is connected to the output 9 of the pulse amplifier, whose counting capacity z can be adjusted according to the number of teeth z of the work piece 2, for which purpose, an adjustment arrangement 11 is provided. The dividing counter 10 counts the incoming pulses. When the counter position reaches the adjusted counting capacity z, the dividing counter 10 produces a pulse at its output 12. At the same time, the dividing counter 10 is reset to zero and begins the counting new pulses. On a second output 13 of the dividing counter 10, the corresponding variable counter level appears continuously and changes with each pulse appearing at output 9. Hence, the output on line 13 is updated each time an input pulse is produced on output 9 of multiplier 7.

The pulse-number of the angular encoder 3 of the grinding wheel 1 may be smaller per revolution of the grinding wheel than the number of pulses of the angular encoder 4 of the work-piece 2 per revolution of the work-piece, while, at the same time, the pulse number of the angular encoder 3 per unit time can be larger than the number of pulses of angular encoder 4 during the same unit of time. The consideration of the relationship of the rpm takes place by means of the mentioned pulse multiplication by the factor g (number of threads on the grinding wheel) and the pulse division by z (number of teeth of the workpiece).

Connected to the first output 12 of the dividing counter 10, is an input, marked + to a balance counter 14. A second input, marked —, of the balance counter 14 is connected to the output 6 of the angular encoder 4 of the work-piece 2. The balance counter 14 forms the difference of the number of incoming pulses in digital form. The contents of the balance counter 14, appear continuously at its output 15.

The system of FIG. 1 further contains means for the interval-wise storage of the contents of the balance counter 14 as well as the dividing counter 10. For this purpose, a first gate circuit 17 is arranged for at output 15 of the balance counter 14, as well as a second gate circuit 18 to output 13 of the dividing counter 10. The outputs of the gate circuits 17 and 18 are respectively connected to the inputs of storage units 19, 20. The control of the gate circuits 17 and 18 takes place by means of a common control line 21, that is connected to the output of a transfer circuit 22. Transfer circuit 22 preferably may be a conventional OR gate. A transfer input 23 of the transfer circuit 22 is connected to the output 6 of the angular encoder 4 of the work-piece 2, while a control input 24 of the transfer circuit 22 is connected to the output of a binary divider 25. A pulse input 26 of the binary divider 25 is also connected to output 12 of the divider counter 10 and a reset input 27 is also connected to output 6 of the angular encoder 4 of work-piece 2. The method of operation of this switching mechanism that includes transfer circuit 22 as well as the binary divider 25, will be discussed below.

Connected to outputs 29, 30 of the two storage units 19 and 20, are respective digital-to-analog converters 31, 32. For digital to analog conversion, a first reference current $I_{ref1}$, which is constant, is provided to the converter 31, while a second reference current $I_{ref2}$ is provided to converter 32. The second reference current is taken from a third digital-analog converter 33, which in turn is supplied with a digital signal corresponding to the adjusted tooth-number z of the work-piece, as well as a third reference current $I_{ref3}$ which is constant. In this way, the third digital-analog converter 33 is connected, by means of a line 34 with the adjustment means 11 for the number of teeth. The digital-to-analog converter 33 is so constructed that its output current, reference current $I_{ref2}$, is proportional to the reciprocal of the adjusted number of teeth.

The first digital-analog converter 31, delivers a current $I_B$ at its output, the second digital-analog converter, a current $I_{SB}$. The two currents $I_B$ and $I_{SB}$ are applied to a summation circuit 35, which, in turn produces its output current $I_A$ that serves for the adjustment of the drive of the work-piece 2 by way of an arrangement that is not shown in FIG. 1.

The method of operation of the system shown in FIG. 1 is described in the following example.

The working process in the grinding of tooth flanks according to the hobbing method demands that the angle of rotation of the grinding wheel, in the present case, of the grinding worm, relates to the angle of rotation of the work-piece in the same way as the number of teeth of the work-piece to the number of threads of the grinding worm. Accordingly, the control for the rotation of the work-piece drive, must assure that the difference of the two relationships is equal to zero. If the angle of rotation of the grinding worm 1 (FIG. 1) is designated as $p_{nominal}$ and the turning angle of the work piece 2 is designated, at a certain point at time t as $p_{actual}$, and, if, as mentioned before, the number of teeth of the work-piece is z and the number of threads of the grinding worm is g, then the rotational control of the drive of the work-piece has to force the relationship $$p_{nominal} \cdot \frac{g}{z} - p_{actual} = 0$$

This is accomplished by means of an analog control signal that is derived from the digital signals of the angular encoders 3 and 4 of the grinding wheel and the work-piece.

For an angular change of the grinding wheel 1 by $\Delta\rho$, the appropriate angular encoder 3, produces a pulse $M_S$. In this manner, the angle of rotation of the grinding wheel 1 is, in the time interval between time periods O and t $$p_{nominal} = \Delta\rho \cdot \sum_{0}^{t} M_S$$

If the number of pulses that are produced by the angular encoder 3 per revolution of the grinding wheel 1, is designated as $N_S$, then $$p_{nominal} = \frac{2\pi}{N_S} \cdot \sum_{0}^{t} M_S$$

Correspondingly, $M_W$ represents a pulse that is produced by the angular encoder 4 of the work-piece 2 and $N_W$ represents the number of the pulses that are produced by the angular encoder 4 per revolution of the work-piece 2. Then, $$p_{actual} = \frac{2\pi}{N_W} \cdot \sum_{0}^{t} M_W$$

In order to produce the required transmission relationship z/g between the rotation of the grinding wheel 1 and the rotation of the work-piece 2, according to FIG. 1, the pulses of the angular encoder 3 and of the grinding wheel 1, are multiplied by g in the pulse multiplier 7, while they are divided by z in the divider counter 10. In this manner, the balance counter 14 contains, at time t, the difference of the number of the output pulses of the dividing counter 10 and the angular encoder 4 in digital form. In other words, the difference is:

$$\frac{g}{z} \sum_{0}^{t} M_S - \sum_{0}^{t} M_W = \frac{N_S}{2\pi} \cdot p_{nominal} \cdot \frac{g}{z} - \frac{N_W}{2\pi} \cdot p_{actual} \quad (5)$$

Theoretically, the number of the pulses of the angular encoder 3 that arrive, after consideration of the transmission relationship g/z, per unit time in the balance counter 14, should agree with the number of pulses arriving from the angular encoder 4 to the balance counter 14 per unit time. This occurs automatically, when the number $N_S$ of the pulses per revolution of the grinding wheel 1 is equal to the number $N_W$ of the pulses per revolution of the work piece 2, i.e. when both of the angular encoders are the same. If this pulse number is designated as N, because it is assumed that $$N_S = N_W = N,$$

then the content of the balance counter 14, is:

$$\frac{N}{2\pi}\left(p_{nominal} \cdot \frac{g}{z} - p_{actual}\right) \quad (6).$$

If, however, the angular encoders 3 and 4 are not equal, but, instead, produce different pulse numbers per rotation, the rotation numbers, that is the pulse numbers of the angular encoders 3 and 4, must be brought to the relationship $$\frac{N_W}{N_S} = 1 \quad (7).$$

The maintenance of these conditions can, however, be carried out also by means of a transmission or reduction, built into the pulse multiplier 7 or in the divider counter 10, or, by appropriate consideration during the input of g or z in the adjustment elements 8 or 11.

The resolution of the angular difference $p_{nominal} \cdot g/z - p_{actual}$ (8), in this basically known form, does not suffice in order to attain the desired accuracy of synchronization. Instead, the phase position of the two pulse signals must also be considered. This takes place, according to this invention and FIG. 1 in the following manner.

The content of the dividing counter 10 which divides the grinding wheel pulses that have been multiplied with the thread number g of the grinding wheel 1, by the number of teeth z, is read and stored at each point in time, when the angular encoder 4 produces a work-piece impulse. At the same time, the content of the balance storage unit 14, is read and stored. The transfer circuit 22 which is normally controlled by the work-piece pulses, produces a control pulse each time when a work piece pulse appears by passing the work-piece pulse on to the gate circuits 17 and 18, which then, at these points in time, transfer the content of the balance counter 14 as well as that of the dividing counter 10, which contains between 0 and z pulses to the storage units 19, 20.

At these points in time, the storage unit 19, accordingly, contains a balance A $$A = \frac{N}{2\pi}\left(p_{nominal} \cdot \frac{g}{z} - p_{actual}\right) \quad (9).$$

and storage unit 20, a sub-balance B that corresponds to the phase position of $M_S \times g/z$ and $M_W$, in the form $$B = \frac{N \cdot z}{2\pi}\left(p_{nominal} \cdot \frac{g}{z} - p_{actual}\right) \quad (10).$$

According to FIG. 1, the content of the storage unit 19 is provided to the digital-to-analog converter 31, which produces an output current $I_B$ which is proportional to balance A (i.e. the content of storage unit 19) and the reference current $I_{ref1}$:

$$I_B = A \cdot I_{ref1} \cdot K_1 \quad (11)$$

where $K_1$ represents the appropriate conversion constant.

Correspondingly, the content B of the storage unit 20, is brought to the digital-to-analog converter 32, which produces an output current $I_{SB}$, which is proportional to the sub-balance B (i.e. the content of storage unit 20) and the reference current $I_{ref2}$:

$$I_{SB} = B \cdot I_{ref2} \cdot K_2 \qquad (12)$$

where $K_2$ is the respective conversion constant.

While the reference current $I_{ref1}$ is constant, reference current $I_{ref2}$ is formed by means of the digital-analog converter 33 from the adjusted number of teeth z:

$$I_{ref2} = \frac{1}{z} \cdot I_{ref3} \cdot K_3 \qquad (13).$$

where $K_3$ is the conversion constant of the digital-to-analog converter 33 and the reference current $I_{ref3}$, again has a constant value. Especially, it can be assumed that $I_{ref3} = I_{ref1} = I_o$, so that $$I_B = A \cdot I_o \cdot K_1 \text{ and } I_{SB} = B \cdot I_o \cdot \frac{1}{z} \cdot K_2 \cdot K_3 \qquad (14).$$

According to FIG. 1, the currents of the digital-analog converters 31 and 32 are added in the summation circuit 35, so that this results in an output current $I_A$ with the value $$I_A = I_B + I_{SB} = A \cdot I_o \cdot K_1 + B \cdot I_o \cdot \frac{K_2 \cdot K_3}{z} = \qquad (15).$$
$$I_o (A \cdot K_1 + B \frac{K_2 K_3}{z})$$

In order that the current $I_{SB}$ actually forms a measure for the phase position of the pulses of the grinding wheel and the work-piece, it has to be valid that, for the case in which a pulse is present in balance counter 14 and z pulses in the dividing counter, for $$A = 1 \text{ and } B = z : I_B = I_{SB} \qquad (16)$$

From this follows the condition $K_1 = K_2 \times K_3$ to the conversion constants.

And hence $$I_A = I_o \cdot \frac{K_1 N}{\pi} \left( P_{nominal} \cdot \frac{g}{z} - P_{actual} \right) \qquad (17).$$

Thus, the output current $I_A$ of the arrangement presented in FIG. 1 is proportional to the angular difference between the grinding wheel 1 and work-piece 2. In this respect, it is especially advantageous that the resolution of this output current corresponds to the resolution of angular encoder 3 of the grinding wheel 1, i.e. the smallest measurable change is determined by a pulse of the angular encoder 3. In other words, the resolution of the output current $I_A$ corresponds to the resolution of angular encoder 4 of work-piece 2, multiplied by the number of teeth z, where, in the known machine tool the factor z is not available for this resolution.

The method of operation of the system of FIG. 1 is further shown in FIGS. 2 and 3, where these figures represent the time-related signal courses in various locations in the block diagram of FIG. 1, for the case of a lagging work-piece drive (FIG. 2) and for an advanced work-piece. In this connection, the assumption is made that the thread number g is 2 and the number of teeth z, is 12. The following time-related signal courses are shown in FIGS. 2 and 3:

first line: at output 5 of the angular encoder 3 of the grinding wheel 1,
second line: at output 9 of the pulse multiplier 7,
third line: at output 12 of the dividing counter 10,
fourth line: at output 6 of the angular encoder 4 of the work-piece,
fifth line: at output 29 of the storage unit 19,
sixth line: at output 30 of the storage unit 20,
seventh line: the balance current $I_B$,
eighth line: the sub-balance current $I_{SB}$ and
ninth line: the output current $I_A$.

As described, the production of a transfer signal that goes through line 21 (FIG. 1) to the gate circuits 17 and 18 takes place, normally, through a work-piece impulse, i.e. a pulse of angular encoder 4. This pulse transfers the contents of balance counter 14 and the dividing counter 10 into the storage units 19, 20. If, however, the axles of the grinding wheel and the work-piece are at a near standstill, it is possible that several grinding wheel pulses per work-piece pulse arrive in the balance counter 14. In such a case, it is meaningless to define in terms of a phase position and, appropriately the transfer signals are then produced by the grinding wheel pulses.

The decision network that is provided for this purpose is composed of the binary divider 25, which receives, at its input 26, the output signals of the dividing counter 10. On the third pulse arriving at input 26, the binary counter 25 provides a pulse to the transfer circuit 22, which triggers a transfer pulse to the gate circuits 17 and 18 by way of line 21. If, however, a work-piece pulse of the angular encoder 4 arrives at input 26 before the third pulse, then the binary divider 25 is reset by this pulse arriving at its reset input 27. At the same time, the work-piece pulse triggers, at input 23 of the transfer circuit 22, a transfer pulse. It is evident that, as already mentioned, the function described of transfer circuit 22 may be accomplished by a conventional OR gate having two inputs, one of them being connected to output 6 of angular encoder 4, and the other one to the output of binary divider 25, In order that no rotational direction problems occur during the start-up of the gear flank grinding machine, the rotation directions of the axles of the grinding wheel and of the work-piece are considered by means of a production of the output current $I_A$ with correct sign. The pulse multiplier 7, the dividing counter 10 and the balance counter 14 take up both rotational directions, in that the mentioned counters are designed to be capable of counting forward as well as backward. The balance counter 14 counts the forward pulses of the angular encoder 3 as positive, backward pulses of the angular encoder 3 as negative, forward pulses of the angular encoder 4, as negative and backward pulses of the angular encoder 4, as positive, the balance counter 14 having no other or additional reset means. In the further described signal evaluation, the consideration of the sign takes place automatically. Thus, the control of the work-piece drive can allow the work-piece to follow the grinding wheel in both rotational directions.

It is known to add an additional signal, especially additional pulses for the working of helically toothed gear work-pieces for the production of an additional turning motion, which is derived from the forward movement of the work-piece or the tool, especially, in other words, from the forward movement of the tool carriage. As set forth in co-pending Patent application Ser. No. 904,969, now U.S. Pat. No. 4,178,537, entitled "System for the Production of an Additional Rotational Motion of a Helically Toothed Gear Work-piece in a Positively Controlled Gear Processing Machine", such a pulse sequence derived from the advance movement is supplied to the controller of the positive movement controlled gear working machine by way of a divider in a digital-incremental form and by way of a digital-to-analog converter in analog form. In the arrangement earlier described in FIG. 1, such a supply of additional signal for the working of helically geared workpieces, may take place easily by bringing the additional digital-incremental signal to the input of the balance counter 14 and the analog additional signal to the input of the summation circuit 35.

It has been found that the accuracy attained by the described phase comparison in the present synchronous control method is so great, that the systematic error of the machine tool, especially on the part of the work-piece, may already begin to interfere. Such systematic errors have been determined and measured, especially in respect of the angular encoder of the work-piece drive, in that the pulse series that is produced by the angular encoder of the work-piece, does not correspond precisely to the appropriate increments of rotation angle, but follows an error curve that is system-conditioned and measurable over a full turn of the work-piece.

Figure 4:
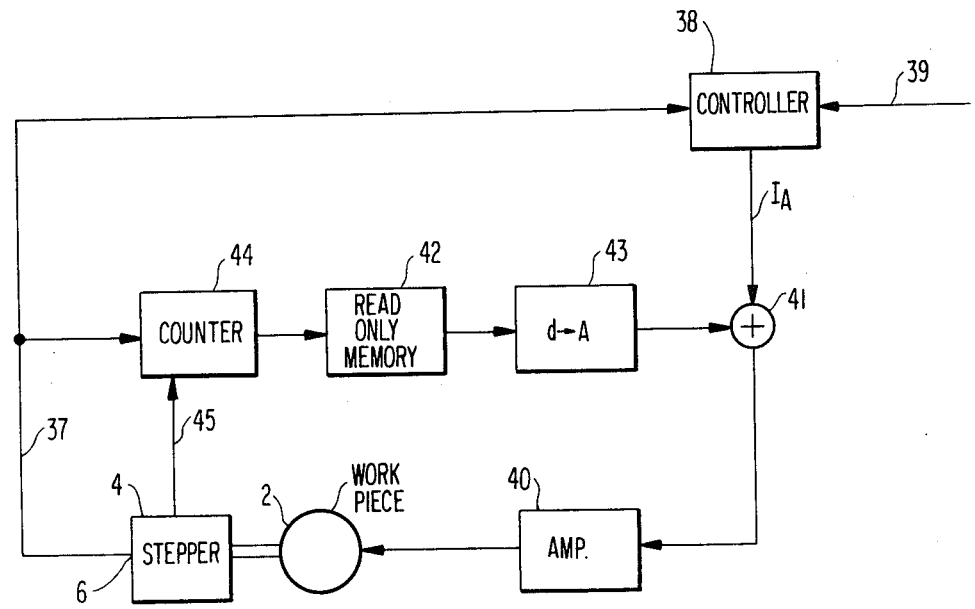
FIG. 4, shows a block diagram of an additional arrangement for the electronic correction of systematic errors.

The measure, further-on explained on the basis of FIG. 4, permits the correction of such systematic errors with simple means by electronic methods and thus to restore the great accuracy of the present synchronous control method that would otherwise have been limited by these systematic errors.

In FIG. 4, in the same way as in FIG. 1, the work-piece 2 that is driven by an electric motor and the angular encoder 4, that is rigidly connected to the work-piece are shown schematically. A certain actual angle of rotation of the work-piece 2 causes, as already mentioned, a corresponding number of pulses at the output 6 of the angular encoder 4, which are supplied to a controller 38 which, here, schematically represents the arrangement of FIG. 1, by way of line 37. By way of line 39, the controller 38 also receives pulses that correspond to the theoretical angle of rotation of the tool, in other words, the output pulses of the angular encoder 3 of FIG. 1. The controller 38 produces the analog control signal $I_A$ (see also FIG. 1), which, after appropriate amplification in an amplifier 40, controls the drive of the tool 2.

The present embodiment is based on the concept of providing a correction signal to the control signal in a summation circuit 41, whic considers a systematic error of the angular encoder 4 including that, perhaps of a present interpolator and of the mechanical transfer members; i.e. a deviation from the congruence of a pulse produced by angular encoder 4 with a certain, constant increment of rotation angle—and that, for each full turn of the work-piece. For this purpose, a correctional curve is stored in digital form in a read-only memory 42, which has been put into the read-only memory 42 on the basis of the measured deviation of the number of pulses of the angular encoder 4 during a revolution of the work-piece from the theoretical value which is proportional to the angle of rotation. The stored correction values are read synchronously during the operation and added to the control signal $I_A$ in the summation circuit 41 after having been converted in a digital-to-analog converter 43. Instead of a separate summation circuit 41, the analog correction signal can also be delivered directly to the summation circuit 35 of FIG. 1.

For addressing the read-only memory 42, this is connected to a counter 44, to the counting input of which the pulses of the angular encoder 4 of work-piece 2 are supplied by way of line 37 and whose indexing, in particular zero-setting at each revolution, also takes place by the angular encoder 4 by means of line 45.

A resolution of about 2% is appropriate for the analog correction signal, which results in a word-length of 6 bits. It is further useful to produce a digital correction signal after each angle of rotation of about 1.5°. It may be derived from this that the read-only memory 42 should have about $6 \times 256 = 1536$ memory spaces, something that can be accomplished without great cost together with the attendant, described address circuit.

What is claimed is:

1. In a method for the synchronous control of a gear machining device working according to the hobbing method, the device having a separate tool drive and a separate work-piece drive, means for producing a first and second series of pulses dependent upon the rotational speed of the tool drive and work-piece drive respectively, means for digitally processing said first and second series of pulses to produce a comparison signal, means for deriving an analog control signal for the adjustment of the work-piece drive from said comparison signal, the control method comprising the steps of:

continuously forming a digital difference between: (i) the number of pulses of said first series, divided by the number of teeth of said work-piece and (ii) the number of the pulses of said second series to provide a difference count, wherein the number of pulses of said second series is formed continuously, and the number of pulses of said first series per unit time is greater by a multiple than the number of pulses of said second series in the same unit time;

counting the pulses of said first series in the time interval between two subsequent pulses of the second series to form a pulse count;

converting said difference count and said pulse count separately into first and second analog signals, respectively; and, summing said first and second analog signals for the formation of said analog control signal, whereby, the first and second analog signals are dependent upon the reciprocal of the number of teeth of said work-piece.

2. The method, according to claim 1, wherein said difference count and said pulse count are stored separately on the occurrence of a pulse of said second series in first and second storage means, respectively.

3. The method according to claim 2, wherein a constant reference current is used for converting the difference count in said first storage means to said first analog signal, and a reference current is used for converting the pulse count in said second storage means to said second analog signal which is proportional to the reciprocal of the number of teeth of the work-piece.

4. The method according to claim 1, wherein said gear machining device is a tooth flank grinding machine, said tool is a worm grinder, wherein a number of pulses of the tool drive is multiplied by the number of threads of the worm grinder.

5. In an apparatus for the synchronous control of a gear machining device, said device having separate work-piece and tool drives, a pulse-generating angular encoder associated with said tool drive and said work-piece drive respectively, the improvement comprising:

an adjustable dividing counter connected to an output of said angular encoder of said tool drive, digital adjustment means associated with said dividing counter for adjusting said dividing counter according to the number of teeth of the work-piece, said dividing counter providing at a first output thereof a pulse signal upon reaching an adjusted count level and being reset automatically thereby, said dividing counter continuously providing at a second output thereof the current digital count state, a balance counter having two inputs and an output, said first output of said dividing counter and an output of said angular encoder of said work-piece drive each being connected to one respective input of said balance counter, first and second gate means each having a signal input, a control input and an output, the output of said balance counter and said second output of the dividing counter being connected respectively to the signal input of one of the first and second gate means, the control inputs of the first and second gate means simultaneously having pulses from said angular encoder of said work-piece drive supplied thereto for passing respective signal input pulses from the output of said balance counter and said second output of said dividing counter, first and second digital storage units connected, respectively, to the outputs of the first and second gate means, first and second digital-to-analog converters connected respectively to the first and second storage units, the outputs of said digital-to-analog converters being additively connected to each other to form an analog control signal, means to supply a constant reference current to the digital-to-analog converter receiving the output signal from said first storage unit connected to the output of the balance counter and, means to supply a reference current proportional to the reciprocal of the number of teeth of said work-piece to said second digital-to-analog converter receiving the output signal from said second storage unit connected to the second output of the dividing counter.

6. Apparatus according to claim 5, further comprising an adjustable pulse multiplier connected between the output of said angular encoder of said tool drive and the input of the dividing counter.

7. Apparatus according to claim 5, further including a transfer circuit having a first input, a second input and an output, the first input being connected to the output of the angular encoder of said work-piece drive and the output being connected to the control inputs of the first and second gate means for simultaneously supplying control pulses thereto, a binary divider having a signal input, a reset input and an output, the signal input of said binary divider being connected to the first output of the dividing counter, the reset input of said binary divider being connected to the output of the angular encoder of said work-piece drive and the output of said binary divider being connected to the second input of said transfer circuit, whereby said transfer circuit supplied a control pulse to the first and and second gate means in response to an output pulse from the angular encoder of said work-piece drive or from the output of said binary divider whichever occurs earlier.

8. Apparatus according to claim 5, wherein said means to supply a reference current to said second digital-to-analog converter includes an additional digital-to-analog converter, said additional converter being connected to the digital adjustment means for the dividing counter and having supplied a constant reference current thereto.

9. Apparatus according to claim 5, further including circuit means for adding an analog correction signal to said analog control signal, said correction signal being indicative of systematic errors of the pulse series from the angular encoder of said work-piece drive over each revolution of the work-piece, said circuit means comprising a read-only memory having stored therein appropriate correction values in digital form, the output of said read-only memory having its output connected to the input of a digital-to-analog converter the output of which is connected to a summation circuit for the control and the correction signals, the input of said read-only memory being connected to the output of a counter having a counting input connected to the output of the angular encoder of said work-piece drive, and a reset input connected to a further output of the angular encoder of said work-piece drive adapted to provide one reset pulse at each revolution of the work-piece.

* * * * *